Figure 1:
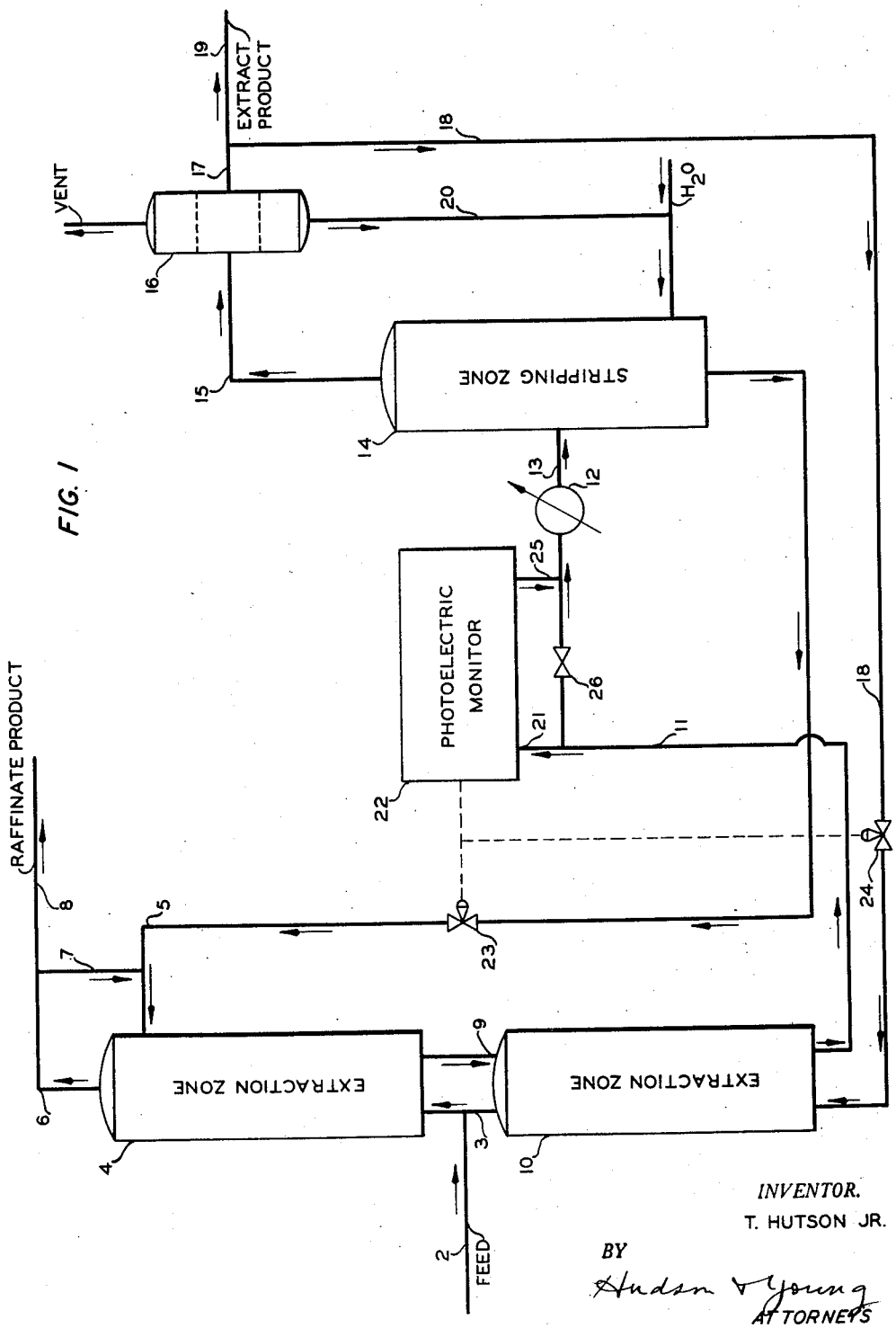

INVENTOR.
T. HUTSON JR.

INVENTOR.
T. HUTSON, JR.

INVENTOR.
T. HUTSON, JR.

United States Patent Office 2,948,676
Patented Aug. 9, 1960

2,948,676

CONTROL OF SOLVENT EXTRACTION BY PHOTO-ELECTRICALLY MONITORING A PHASE THEREFROM

Thomas Hutson, Jr., Phillips, Tex., assignor to Phillips Petroleum Company, a corporation of Delaware Filed May 28, 1956, Ser. No. 587,634

6 Claims. (Cl. 208—322)

This invention relates to solvent extraction. In one aspect, the invention relates to the control of a solvent extraction operation by controlling one or more flows in said operation, responsive to changes in amounts or character of light transmitted therethrough as detected by a photoelectric monitor which, in turn, is operatively connected to an element in the control mechanism operating upon one of said streams. In another of its aspects, this invention relates to an improved solvent extraction operation wherein a liquid-liquid solvent extraction is at least in part controlled by measuring carry-over of dispersed phase in the extract phase with a photoelectric monitor and employing the resulting measurement to control solvent inlet rate.

Generally speaking, solvent extraction operations are well known in the art. Ordinarily, in one form of operation, a liquid-liquid extraction is accomplished by feeding a material to be extracted, that is, one in which there are present at least two different chemical entities which have different solubilities or preferences in the presence of each other or a solvent, into a solvent extraction zone in which the material is contacted with a solvent usually in countercurrent flow. At one end of the zone, there is removed a raffinate portion or a portion which represents that chemical entity which is not as soluble in the solvent as the other and an extract phase which contains said other entity.

It is often desirable to operate the solvent extraction zone or column, as the case may be, at a liquid load which is near its flood point. Flooding is ordinarily defined as excessive carry-over of dispersed phase in the extract. It is known to measure carry-over by taking a sample and allowing it to separate into two phases and then measuring the amount of each phase. While a small amount of carry-over is usually permissible, it will be evident that by the time the sample has been taken, separated into two phases and measured as stated, the operation may have considerably varied in an undesirable manner or an undesirable operation may even be occurring when the sample is taken and there will be a considerable delay of time before results of measurement upon the sample can be applied to make a correction of the variable causing the undesired or excessive carry-over.

It has now been conceived that immediate or substantially immediate correction of carry-over can be accomplished by employing a photoelectric monitor upon the extract phase stream leaving the solvent extraction operation. Thus, regardless of its cause, excessive carry-over can be continuously and virtually instantaneously controlled by measuring the turbidity or light transmission ability of the extract phase stream, or, for that matter, of any other stream which is related to the operation in such a manner that it will tell the photoelectric monitor that something is proceeding in an undesirable manner.

It is an object of this invention to provide an improved solvent extraction operation. Another object of this invention is the provision of a controlled system for a solvent extraction operation or column. A still further object of the invention is the provision of a photoelectric monitor upon a stream of a solvent extraction operation, which stream will vary in its light transmission ability in a manner such as to permit the photoelectric monitor to control at least one other variable in the process in a manner to correct deviations from desired conditions for which the monitor can be preset.

Other aspects, objects and advantages of the invention are apparent from this specification, the drawings and appended claims.

According to this invention, there are provided a process and apparatus which comprises a solvent extraction system in which at least one stream is monitored with a photoelectric monitor which, in turn, controls at least one variable in the operation so as to produce a substantially constant composition in at least one of the flows which emanate from the operation and wherein the apparatus comprises a photoelectric monitor operatively connected to monitor at least one discharge line from a solvent extraction vessel and to control at least one feed line to said vessel responsive to variations of light transmitted through material flowing in said discharge line.

In the drawing, there is shown an operation in which high purity cyclohexane (99 plus weight percent) is produced from a stream of lower purity containing about 85 weight percent cyclohexane and about 15 percent of undesired material.

Thus, in Figure 1 of the drawings, there is shown a wet furfural extraction of an impure cyclohexane to produce a high purity cyclohexane. Also, in the drawing is shown a methyl Carbitol extraction of a hydrocarbon feed containing aromatics. Thus, in Figure 2, aromatics are extracted from a hydrocarbon feed boiling in the range 250 to 401° F. and having an API gravity of 53.4. Figure 3 shows a wiring scheme in which a photoelectric monitor controls a valve in a reflux supply line responsive to carry-over of feed in the extract phase.

Referring now to Figure 1 of the drawing, a hydrocarbon feed containing 85.1 weight percent cyclohexane is fed by way of conduit 2 into conduit 3 and by way of conduit 3 into upper extraction zone 4 wherein it is contacted with a stream consisting essentially of wet furfural fed to 4 by way of conduit 5, a raffinate product is taken overhead by way of conduit 6. At least a portion of the raffinate product is recycled by way of conduit 7 and conduit 5 as reflux for section 4. Production quantities of raffinate are removed from the process by way of conduit 8. An intermediate extract phase is removed from section 4 by way of conduit 9 and passed into lower section 10 wherein a final extract phase is formed and removed from section 10 by way of conduit 11 and passed by way of preheater 12 and conduit 13 into extract stripper 14. An intermediate raffinate which is formed in section 10 is passed by way of conduit 3 together with the feed into section 4, as earlier indicated. In extract stripper 14, extract is stripped from the solvent which is removed at the bottom of the stripper and returned by way of pipe 5 to the upper portion of section 4 and there used as already described. Overhead is taken from extract stripper 14 by way of conduit 15 and passed to phase separator 16. In phase separator 16, extract is recovered and taken by way of conduit 17 in part as extract recycle which passes by way of conduit 18 into section 10. Production quantities of extract are removed from the process by way of conduit 19. Water which is the lower phase in 16 is passed by way of conduit 20 to the lower portion of the extract stripper 14. It is preferred to control the solvent feed rate but the extract recycle feed rate or both may also be controlled by passing a slip stream of extract phase by way of conduit 21 into photoelectric monitor 22 which is adjusted to operate valve 23 in conduit 5 supplying solvent to the extraction in section 4. Thus, depending upon the light intensity changes which can be caused by the carry-over, monitor 22 will suitably adjust valve 23 to immediately compensate for any deviation from a desired predetermined operation. Also, monitor 22 is operatively connected with valve 24 in conduit 18 and as desired, can be used to adjust the amount of extract recycle through conduit 18 into section 10. It will be understood by those skilled in the art in possession of the concept of the present invention and this disclosure setting it forth together with the description herein made of embodiments according to the invention that separate monitors can be installed upon each of the several described streams, or on other streams. Also, the said monitors can be used separately or in any desired combination. After passing through the monitor, the slip stream is returned to pipe 11 by way of pipe 25, a valve 26 is used to adjust the flow to the monitor.

The construction of flow colorimeters is known. An instrument such as the Beckman Industrial Flow Colorimeter or as described by R. J. Loyd in application Serial No. 499,717, filed April 6, 1955, and now abandoned, can be used successfully in carrying out the invention here set forth and described. Basically, as is known, a photoelectric cell is arranged to be sensitive to light transmitted through the stream being sampled. Variations in output of the cell after suitable amplification are employed to control by electric relay or otherwise a feed valve, as described herein or alternately or concomitantly to reset or to override some other instrument which controls a process stream or variable.

In the embodiment just described, the use of wet furfural reduces the rate of polymer formation in the furfural which results from the lower kettle temperature (210° F. in the wet process and 330° F. in the dry process) permissible with the wet solvent. Furthermore, it will be noted that the extract stripping step can be controlled by controlling the rate of water introduction in the stripper kettle.

Generally, in the operation of the invention, the solvent is usually the continuous phase but the present invention is also applicable to processes wherein solvent is the dispersed phase. When the solvent is the dispersed phase, the sample is preferably taken from the raffinate stream. However, under certain conditions, flooding may be detected in either the extract or raffinate streams regardless of whether the solvent is the dispered or continuous phase.

Figure 2:
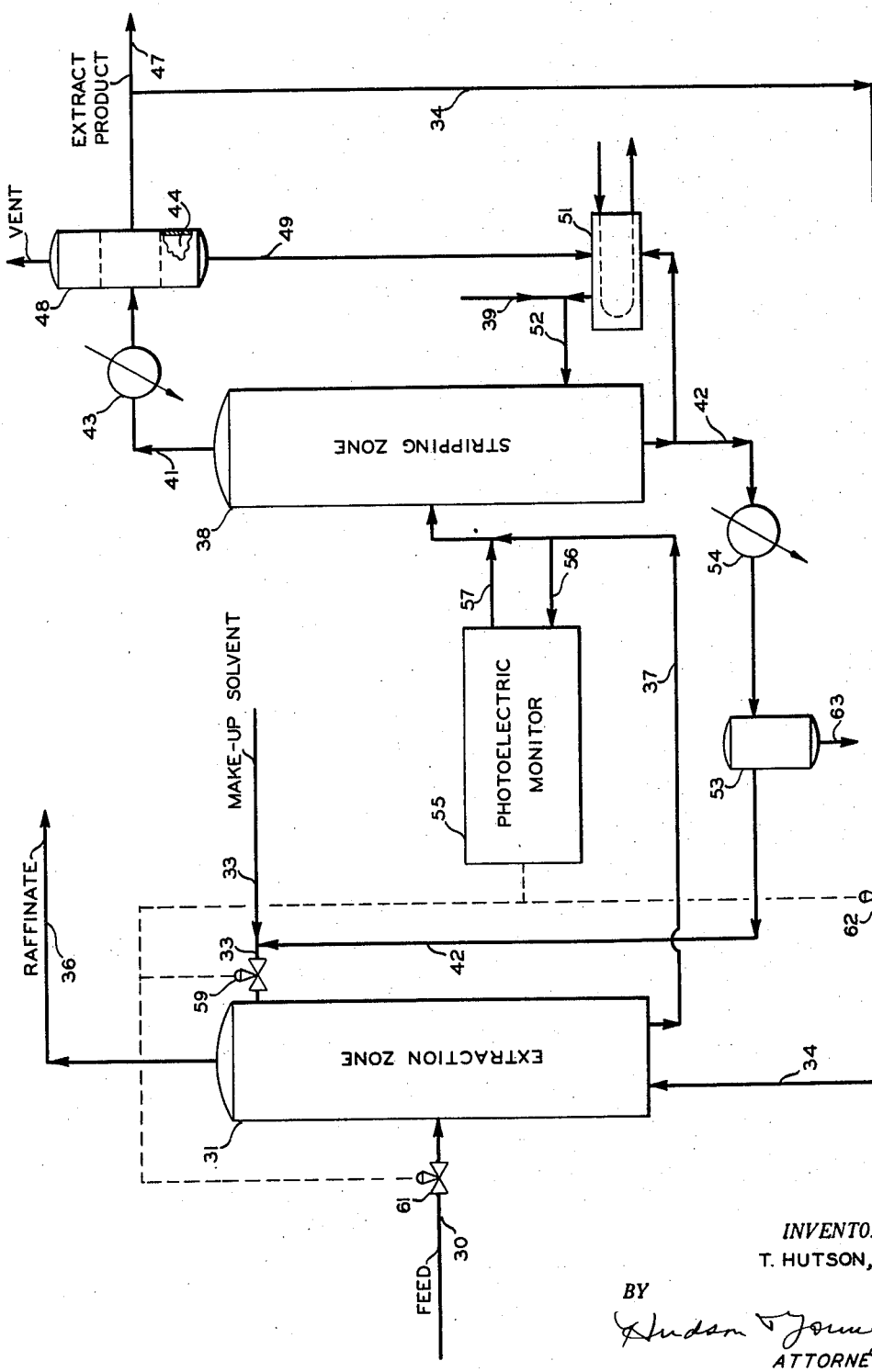
Figure 3:
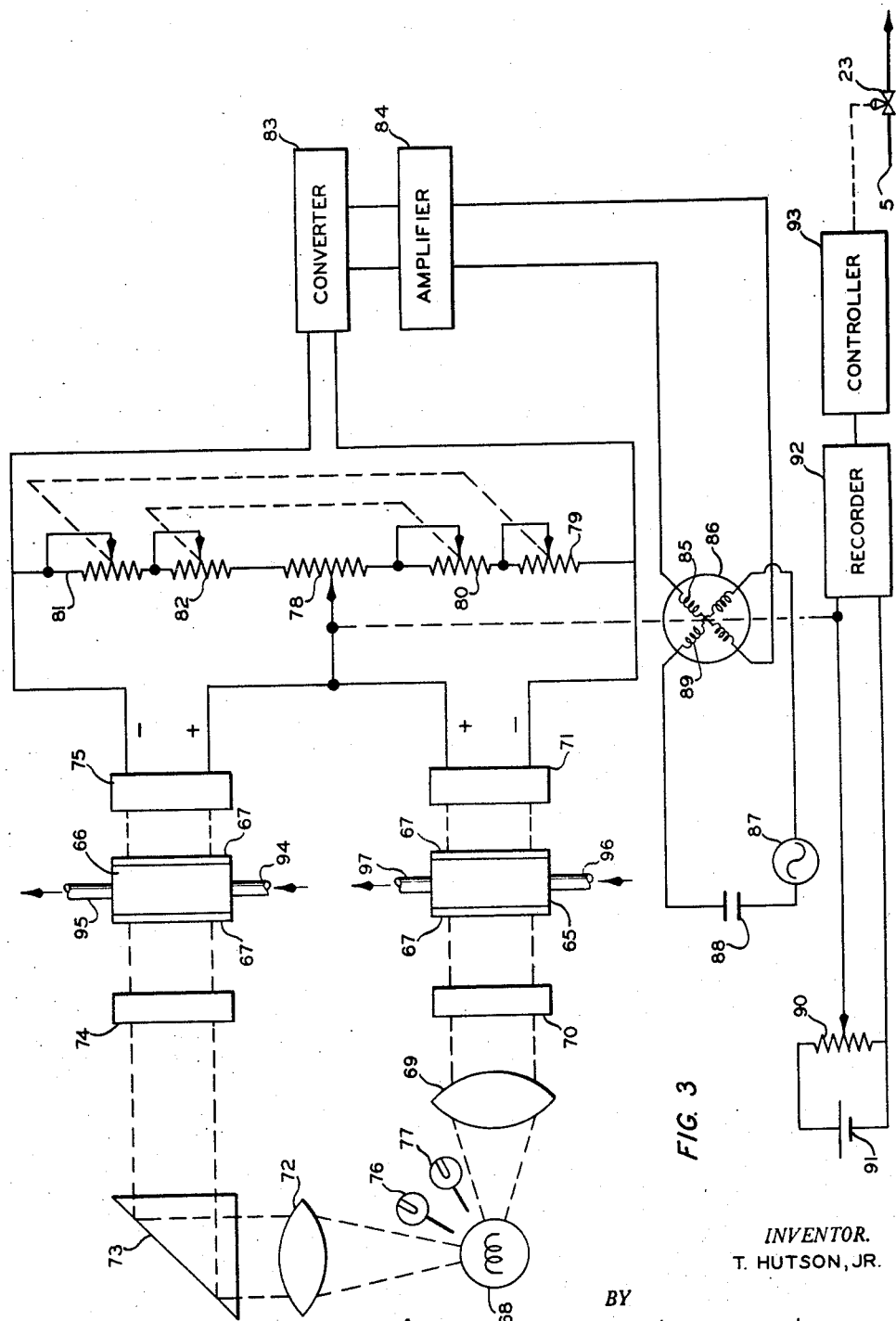

Referring now to Figure 2 of the drawing, a straight run gasoline feed, as described, is fed via conduit 30 into extraction zone 31. A solvent-free raffinate is removed overhead by way of conduit 36. The feed is preferably fed near the mid-point of the extraction zone at a temperature of about 100 to 200° F. so as to maintain the system, together with added solvent described below at a solvent extraction temperature within the range of about 100 to 150° F. A methyl Carbitol-water stream is introduced by way of conduit 33 into an upper portion of zone 31 at a temperature, generally, of about 120 to about 160° F., in any event, so as to maintain the above-mentioned solvent extraction temperature in zone 31. Methyl Carbitol is diethylene glycol monomethyl ether. The liquid volume ratio of solvent (methyl Carbitol plus water) to hydrocarbon in zone 31, although generally within the range described in application Serial No. 479,183, filed by me and W. G. Morrison on December 31, 1954, and now U.S. Patent No. 2,826,535, is preferably maintained at about 12:1 to 16:1. The liquid volume ratio of water to methyl Carbitol in the solvent introduced from conduit 33 is generally within the range as described in said Serial No. 479,183, now U.S. Patent No. 2,826,535, although preferably it is in the range of about 0.15:1 to 0.25:1. Reflux is introduced into a lower portion of zone 31 by way of conduit 34. This reflux is obtained as hereinafter discussed. Raffinate phase which is taken overhead by way of conduit 36 will contain predominantly paraffinic hydrocarbons and some solvent. The ratio of solvent to hydrocarbons on a volume basis will be about 0.001:1 to about 0.05:1. Purification of raffinate phase product is accomplished in known manner and is not shown for sake of simplicity.

Extract phase comprising methyl Carbitol-water-hydrocarbon (substantially aromatic) is withdrawn from zone 31 by way of conduit 37 and passed to extract distillation, or stripping, zone 38 wherein water-Carbitol is separated as kettle product notwithstanding that a substantial portion of the extract hydrocarbons normally boil in a range higher than the boiling point of the methyl Carbitol-water solvent; the boiling range of the aromatic extract hydrocarbons, in this embodiment, being within the limits of about 242 to 391° F. Details of the operation of zone 38 are described more fully in said Serial No. 479,183. Briefly, water and/or steam introduced by way of conduits 39 and 52 to zone 38 is introduced in an amount sufficient to cause substantially all hydrocarbons to leave zone 38 as overhead product, thereby leaving as bottoms substantially hydrocarbon-free solvent. The operation of zone 38 in this manner is claimed in said Serial No. 479,183.

Overhead from distillation zone 38 is taken by way of conduit 41 and cooler 43 to tank 48. In this tank, aromatics separate from solvent and are, in part, passed by way of conduit 47 to storage as a product of the process. Separated water phase containing some solvent, usually a trace, is passed by way of conduit 49 through reboiler 51 at a rate such as to maintain a two-phase system in tank 48. The lower phase is indicated by number 44. Hydrocarbon-free solvent is taken from the bottom of distillation zone 38 by way of conduit 42 and passed, in part, to reboiler 51. The remainder of the solvent is passed by way of conduit 42, cooler 54 and surge tank 53, valve 59 and conduit 33 to the top of extraction zone 31. Make-up solvent can be added as required and as later described by way of conduits 33 entering the system by way of valve 59. A pre-determined desired proportion of extract is passed by way of conduit 34 to the foot of extraction zone 31 as reflux therefor. According to the invention, a small portion or slip stream of extract is passed from conduit 37 by way of conduit 56 to monitor 55 and returned to conduit 37 by way of conduit 57, monitor 55 is operatively connected to the following valves: valve 61 in feed conduit 30, valve 59 in solvent return conduit 42, and control valve 62 in extract return or reflux conduit 34; depending upon the nature of the light transmission ability of the extract slip stream passing through monitor 55, one or more of valves 61, 59 and 62 can be controlled. It is preferred, however, in this embodiment, to control valve 59. It will be seen by one skilled in the art in possession of this disclosure and its concept that the invention provides great flexibility in the selection of the optimum point from which to take the feed for the monitor apparatus. Also, the invention provides great flexibility of control by providing a choice of several places at which to exercise the control responsive to the indications given by the monitor. Operation according to the manner described in either Figure 1 or Figure 2 yields very good controlled flow and permits operation with a liquid load in the solvent extraction column which is very near its flood point. It will be understood that the embodiments described are by way of example only and that the invention is not limited to the specific examples which have been given.

Surge tank 53 provides for the accumulation of excess solvent which can be withdrawn through conduit 63.

Figure 3 is a diagrammatic illustration of the installation of a photoelectric monitor to control a valve. It will be seen that the current generated by the photoelectric cell of the invention as it varies due to variations in light intensity transmitted through the sample to it, upon amplification, will control valve 23 in the solvent feed line 5.

The optical and electrical components of the analyzer are also illustrated in Figure 3. Cells 65 and 66 are provided with transparent windows 67. Radiation in the visible spectrum is provided by lamp 68. A first beam of radiation from lamp 68 is directed by a collimating lens 69 through a filter 70 and cell 65 to impinge upon a first photoelectric cell 71. A second beam of radiation is directed from source 68 by a second collimating lens 72 to a prism reflector 73 and thence through a filter 74 and cell 66 to impinge upon a second photoelectric cell 75. Light trimmers 76 and 77 are positioned so as to be rotatable into the respective beams of radiation to reduce the beams as desired. The filters reduce the transmitted radiation at wave lengths other than the desired, in order to avoid or reduce possible interference. Photocells 71 and 75 are of the barrier-layer type.

Corresponding first terminals of photocells 71 and 75 are connected to one another and to the contactor of a potentiometer 78. The second terminal of photocell 71 is connected to one end terminal of a first variable resistor 79. The second end terminal of variable resistor 79 is connected to the first end terminal of a second variable resistor 80. The second end terminal of resistor 80 is connected to the first end terminal of potentiometer 78. The second terminal of photocell 75 is connected to one terminal of a third variable resistor 81. The second terminal of resistor 81 is connected to the first terminal of a variable resistor 82. The second terminal of resistor 82 is connected to the second end terminal of potentiometer 78. The second terminals of photocells 71 and 75 are also connected to the respective input terminals of a converter 83 which changes a direct current potential into a corresponding alternating current. The output terminals of converter 83 are connected to the input terminals of an alternating current amplifier 84. The output terminals of amplifier 84 are connected across the first winding 85 of a reversible two-phase servo-motor 86. An alternating current source 87 of the same frequency as the output signal from converter 83 is connected in series with a capacitor 88 and a second winding 89 of motor 86. The drive shaft of motor 86 is mechanically coupled to the contactor of potentiometer 78. Converter 83, amplifier 84, and motor 86 can represent any type of known servo-mechanism, such as the system illustrated in "The Electronic Control Handbook," Batcher and Moulic, Caldwell Clemments, Inc., New York, 1946, page 298.

The drive shaft of motor 86 is also mechanically coupled to the contactor of a telemetering potentiometer 90. A voltage source 91 is connected across the end terminals of potentiometer 90. The contactor and one end terminal of potentiometer 90 are connected to the respective input terminals of a recorder 92 to provide a record of the rotation of motor 86. Recorder 92 is connected to controller 93 and the output signal from this controller is applied to valve 23 in line 5 as described in Figure 1. Obviously, the output from controller 93 can be applied to any of the other valves used to control the process, as described previously.

The sample to be analyzed is introduced to sample cell 66 through line 94 and is removed through line 95. A reference sample is used in cell 65. Sample cell 65 may be sealed to retain the reference material, but preferably a flowing stream of reference material is used which is introduced through line 96 and removed through line 97. The reference material is preferably the solvent feed such as contained in line 5 of Figure 1 or line 33 of Figure 2. The use of a flowing sample automatically compensates for slight variations in the color of the solvent which might result from extended use of the same, say, for example, a period of weeks or months. Referring to Figures 1 and 2, the sample material in line 94 is obtained from lines 21 or 56, respectively. Material leaving the sample cell through line 95 is returned to either line 25 or 57 of Figures 1 and 2, respectively.

EXAMPLE I

In a specific example of the operation of the embodiment of the invention illustrated in Figure 1, the general operation of this embodiment having been described previously, a feed material containing about 85 weight percent cyclohexane and boiling in the range of 176 to 178° F. is introduced intermediate the two sections of the extraction zone. The feed also contains methylcyclopentane, 2,2-dimethylpentane, 2,4-dimethylpentane, 3,3-dimethylpentane, 1,1-dimethylcyclohexane, 2,3-dimethylpentane and 2-methylhexane. The temperature at the top of the top section and at the bottom of the bottom section is 106 and 104° F., respectively. The pressure at the bottom of the bottom section is 30 p.s.i.g. Each section of the extraction zone is four inches in diameter by 30 feet high and is packed with ½ inch Berl saddles. The temperature at the top and bottom, respectively, of the extract stripper is 162 and 210° F. and the top operates at essentially atmospheric pressure. The column is equipped with an internal reflux coil which provides 139 pounds/hour of reflux. An extract stream is removed from the bottom of the bottom section of the extractor, heated to 154° F. and introduced into the extract stripper. A portion of this stream is passed through a photoelectric monitor wherein the amount of entrained hydrocarbon is continuously determined. A control signal is produced by this determination and is used to control the solvent feed rate so as to automatically maintain the amount of entrained hydrocarbon in the extract stream at about 0.1 liquid volume percent.

Flow rates, temperatures, compositions, etc., for the streams are shown in the following Table I.

*Table I*

| | Feed | Solvent | Raffinate | | | Extract | | | Recycle Water |
| | | | Intermediate | Recycle | Product | Intermediate | Recycle | Product | |
|---|---|---|---|---|---|---|---|---|---|
| Stream No. | 2 | 5 | 3 | 7 | 8 | 9 | 18 | 19 | 20 |
| Rate, g.p.h. | 1.76 | 45 | | 4.5 | 0.42 | | 7.73 | 1.34 | 0.63 |
| Temp, °F. | 103 | | 103 | 106 | | 103 | | | |
| Sp. gr. | [1] 0.7639 | [2] 1.146 | [1] 0.7687 | [1] 0.7172 | [1] 0.7172 | [2] 1.100 | [1] 0.7782 | [1] 0.7782 | |
| Composition, weight percent: | | | | | | | | | |
| Cyclohexane | 85.1 | | 89.0 | 36.3 | 36.3 | [3] 90.6 | 99.1 | 99.1 | |
| Furfural | 0.0 | 93.8 | 8.07 | 6.23 | 6.23 | | 0.11 | 0.11 | 0.27 |
| Water | | 6.2 | | | | 4.8 | | | 99.73 |

[1] Sp. gr. 20/4° C.
[2] Sp. gr. 60/60° F.
[3] Cyclohexane in solvent-free hydrocarbon.

EXAMPLE II

In a specific example of the operation of the embodiment of the invention illustrated in Figure 2, a feed material comprising straight run gasoline having a boiling range of 250 to 401° F. is fed to the extraction zone near the midpoint thereof. The feed is countercurrently contacted with a methyl Carbitol-water mixture which is introduced near the top of the extraction zone. The solvent contains about 20 weight percent water. Flow rates, API gravities, and boiling ranges of the streams are shown in the following Table II. In the extraction zone, the temperature at the feed point and at the bottom is about 130 and 120° F., respectively. The pressure at the bottom of the extraction zone is about 30 p.s.i.g. Temperatures at the top and bottom of the stripping zone are 216 and 228° F., respectively. Pressures at the top and bottom of the stripping zone are 5.8 and 8 p.s.i.g., respectively. The recycle solvent from the stripping zone is essentially hydrocarbon free. Recycle water from the stripping zone accumulator contains a trace of methyl Carbitol. An extract stream is removed from the bottom of the extraction zone and passed to the stripper, a portion of this stream is passed through a photoelectric monitor wherein the amount of entrained hydrocarbon is continuously determined, and a control signal is produced by this determination which is used to control the solvent feed rate so as to automatically maintain the amount of entrained hydrocarbon in the extract leaving the extraction zone at about 0.1 liquid volume percent.

Table II

|  | Feed | Raffinate | Extract | |
|---|---|---|---|---|
|  |  |  | Recycle | Product |
| Stream No. | 30 | 36 | 34 | 47 |
| Rate, g.p.h. | 7.00 | 6.45 | 3.0 | 0.49 |
| Gravity, API | 53.4 | 55.1 | 34.8 | 34.8 |
| Boiling range, ° F. |  |  |  |  |
| IBP | 250 | 253 | 242 | 242 |
| 10% | 262 | 263 | 260 | 260 |
| 50% | 293 | 292 | 288 | 288 |
| 95% | 373 | 374 | 349 | 349 |
| EP | 401 | 396 | 391 | 391 |

While the invention has been described as it relates to the operations of Figures 1, 2 and 3, it is within its scope, generally, to be applied to other feed stocks, solvents, etc., as is known in the art. Specific embodiments of the invention have been described in connection with solvents which have a density greater than the feed, but the invention is also applicable to solvents having a density less than the feed. In such cases, the extract and solvent is removed from the top of the extraction zone. The solvent and extract streams may be separated by means other than fractionation. If fractionation is used, the solvent may be lower boiling than the feed and thus be removed overhead in the extract stripper. When using a solvent having a density greater than the feed, the interface in the extraction zone is usually maintained near the top but may be maintained near the bottom, if desired.

In the drawings, details which are essential to in-the-plant operation but which one skilled in the art does not need for a full understanding of the claimed invention have been omitted for sake of clarity.

Reasonable variation and modification are possible within the scope of the foregoing disclosure, drawings, and the appended claims to the invention, the essence of which is that a light transmission sensitive electric monitor is employed to analyze a stream in a solvent extraction operation and to control at least one other stream in said operation responsive to indications of operation conditions by said monitor.

I claim:

1. A solvent extraction operation which comprises extracting a feed with a selective solvent, forming and withdrawing from the operation a raffinate phase and an extract phase, monitoring the composition of at least one of said withdrawn phases by passing at least a portion of at least one of said phases as said phase through a photoelectric monitor and controlling at least one variable of the operation responsive to indications of changes in said phase which are indicated by said monitor.

2. A solvent extraction operation which comprises extracting a feed stock with a selective solvent, obtaining and removing from the operation a raffinate phase and an extract phase, separating extract product from said extract phase and recycling a portion of said extract product as a reflux for said extraction operation, monitoring at least one of said removed raffinate phase as said phase and extract phase as said phase by passing at least a portion of one of said phases through a photoelectric monitor wherein light passed through said phase passing therethrough is photoelectrically detected resulting in a current of electricity and controlling at least one of the solvent feed rate, the feed rate and the reflux rate responsive to changes indicated by changes in said current by using said current, with suitable amplification, to operate a control upon at least one of said solvent feed, the feed and the reflux to the operation.

3. In a solvent extraction operation wherein a material is extracted with a selective solvent resulting in the formation of a raffinate phase and an extract phase in which extract phase as it is withdrawn there is desirably contained a small amount of carry-over of feed, controlling the amount of carry-over in the extract phase by passing at least a portion of said phase as said phase through a photoelectric monitor and using the signal from the monitor to control at least one of the solvent feed, the feed of material to be extracted and a reflux which is fed to said solvent extraction.

4. A solvent extraction operation which comprises the following steps in combination: solvent extracting a hydrocarbon feed containing about 85 percent by weight of cyclohexane with a solvent consisting essentially of furfural and containing some water in a solvent extraction zone to obtain a raffinate phase and an extract phase which is withdrawn from the operation, and controlling the flow rate of solvent to said zone responsive to signals obtained from a photoelectric monitor analyzing light transmitted through at least a portion of the withdrawn extract phase as said phase as it is obtained from the solvent extraction operation.

5. A solvent extraction operation which comprises the steps in combination as follows: solvent extracting a hydrocarbon feed containing aromatics with a solvent consisting essentially of methyl Carbitol in water in a solvent extraction zone to obtain a raffinate and an extract phase, and controlling the flow rate of solvent to said zone responsive to signals obtained from a photoelectric monitoring zone through which there is passed at least a portion of the extract phase as said phase is obtained from the operation.

6. A solvent extraction operation which comprises extracting a feed stock with a selective solvent, obtaining and removing from the operation a raffinate phase and an extract phase, separating extract product from said extract phase and recycling a portion of said extract product as a reflux for said extraction operation, monitoring at least one of said removed raffinate phase and extract phase by passing at least a portion of one of said phases as said phase through a photoelectric monitor wherein light passed through said phase passing through said monitor is photoelectrically detected resulting in a current of electricity and controlling at least one of the solvent feed rate, and the feed rate responsive to changes indicated by changes in said current by using said current, with suitable amplification, to operate a control upon at least one of said solvent feed, the feed and the reflux to the operation.

References Cited in the file of this patent

UNITED STATES PATENTS

| | | | |
|---|---|---|---|
| 1,908,018 | Henderson | May 9, | 1933 |
| 2,047,985 | Weir | July 21, | 1936 |
| 2,090,915 | Powell et al. | Aug. 24, | 1937 |
| 2,343,611 | Cope et al. | Mar. 7, | 1944 |
| 2,386,830 | Wright | Oct. 16, | 1945 |
| 2,386,831 | Wright | Oct. 16, | 1945 |
| 2,447,985 | Mass | Aug. 24, | 1948 |
| 2,459,404 | Anderson | Jan. 18, | 1949 |
| 2,519,081 | Skarstrom | Aug. 15, | 1950 |
| 2,529,030 | Latchum | Nov. 7, | 1950 |
| 2,689,874 | Findlay | Sept. 21, | 1954 |
| 2,692,820 | Alway et al. | Oct. 26, | 1954 |
| 2,696,464 | Mathis et al. | Dec. 7, | 1954 |
| 2,727,848 | Georgian | Dec. 20, | 1955 |
| 2,737,469 | Anderson et al. | Mar. 6, | 1956 |
| 2,745,790 | Manley | May 15, | 1956 |
| 2,748,055 | Payne | May 29, | 1956 |
| 2,776,305 | Habicht | Jan. 1, | 1957 |
| 2,809,222 | Hawkins | Oct. 8, | 1957 |